United States Patent [19]

Midkiff

[11] Patent Number: 4,917,125

[45] Date of Patent: Apr. 17, 1990

[54] TRUCK TIRE WASHING APPARATUS

[75] Inventor: David G. Midkiff, Falls Church, Va.

[73] Assignee: Marking Designs Inc., Fredericksburg, Va.

[21] Appl. No.: 331,984

[22] Filed: Apr. 3, 1989

[51] Int. Cl.[4] .................................................. B60S 3/04
[52] U.S. Cl. ..................................................... 134/123
[58] Field of Search ............. 134/45, 123; 15/DIG. 2, 15/53 B; 137/234.6

[56] References Cited

U.S. PATENT DOCUMENTS

| | | | |
|---|---|---|---|
| 118,085 | 8/1871 | Weston | 134/123 |
| 620,321 | 2/1899 | Holcomb | 104/72 |
| 830,463 | 9/1906 | Sutherlin | 134/123 |
| 1,338,714 | 5/1920 | Wagner | 15/52 B X |
| 1,412,732 | 4/1922 | Young | 15/53 B X |
| 1,467,994 | 9/1923 | Bohland | 134/123 |
| 1,479,841 | 1/1924 | Stover | 15/53 B X |
| 1,484,071 | 2/1924 | Memmen | 134/45 |
| 1,487,062 | 3/1924 | Hohl | 134/123 X |
| 1,651,045 | 11/1927 | Smith | 134/123 |
| 1,694,197 | 12/1928 | Woodling | 134/45 |
| 1,909,869 | 3/1933 | Randrup | 15/53 B X |
| 2,716,767 | 9/1955 | Davis | 15/53 B X |
| 2,718,650 | 9/1955 | Haverberg | 15/53 B X |
| 2,797,006 | 1/1957 | Thompson | 15/DIG. 2 |
| 2,814,825 | 12/1957 | Guthrie, Jr. et al. | 134/123 X |
| 2,981,266 | 4/1961 | Tamburri | 134/123 X |
| 2,997,048 | 8/1961 | Gertkerr et al. | 134/123 X |
| 3,058,133 | 10/1962 | Haverberg | 15/53 B X |
| 3,179,117 | 4/1965 | Gibson et al. | 134/123 X |
| 3,321,793 | 5/1967 | Braunger | 134/45 X |
| 3,593,726 | 7/1971 | Lockhart | 134/45 |
| 3,681,805 | 8/1972 | Shelstad et al. | 134/45 X |
| 3,698,029 | 10/1972 | Pulliam | 134/123 X |
| 3,772,723 | 11/1973 | Krimm | 15/DIG. 2 |
| 3,903,559 | 9/1975 | Kuster et al. | 15/DIG. 2 |

FOREIGN PATENT DOCUMENTS

| | | | |
|---|---|---|---|
| 2117147 | 10/1972 | Fed. Rep. of Germany | 134/123 |
| 2642959 | 3/1978 | Fed. Rep. of Germany | 134/123 |
| 0030856 | 2/1983 | Japan | 15/53 B |
| 1065486 | 4/1967 | United Kingdom | 134/123 |

Primary Examiner—Philip R. Coe
Attorney, Agent, or Firm—Sughrue, Mion, Zinn, Macpeak & Seas

[57] ABSTRACT

An in-the-ground truck tire washing appartaus having steel grates on which the truck rides. The grates are mounted above the bottom of a concrete trough and are hinged so that the trough can be opened to remove accumulated sediment from the bottom thereof. The grates cause flexing of the tire to enhance the cleansing motion of water which is above the level of the top surfaces of the grates. The top edges of the grates may be smooth or serrated. The serrated grates dislodge mud and dirt embedded in the treads of the tires. In a portable embodiment of the invention, a tire washing apparatus is mounted on a trailer bed and has driven rollers for rotating the truck tires while they are sprayed by jets of water. Additional roller assemblies are provided to prevent sideway movement of the tires.

6 Claims, 6 Drawing Sheets

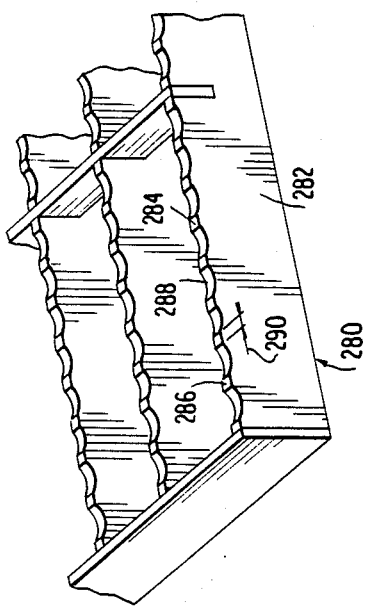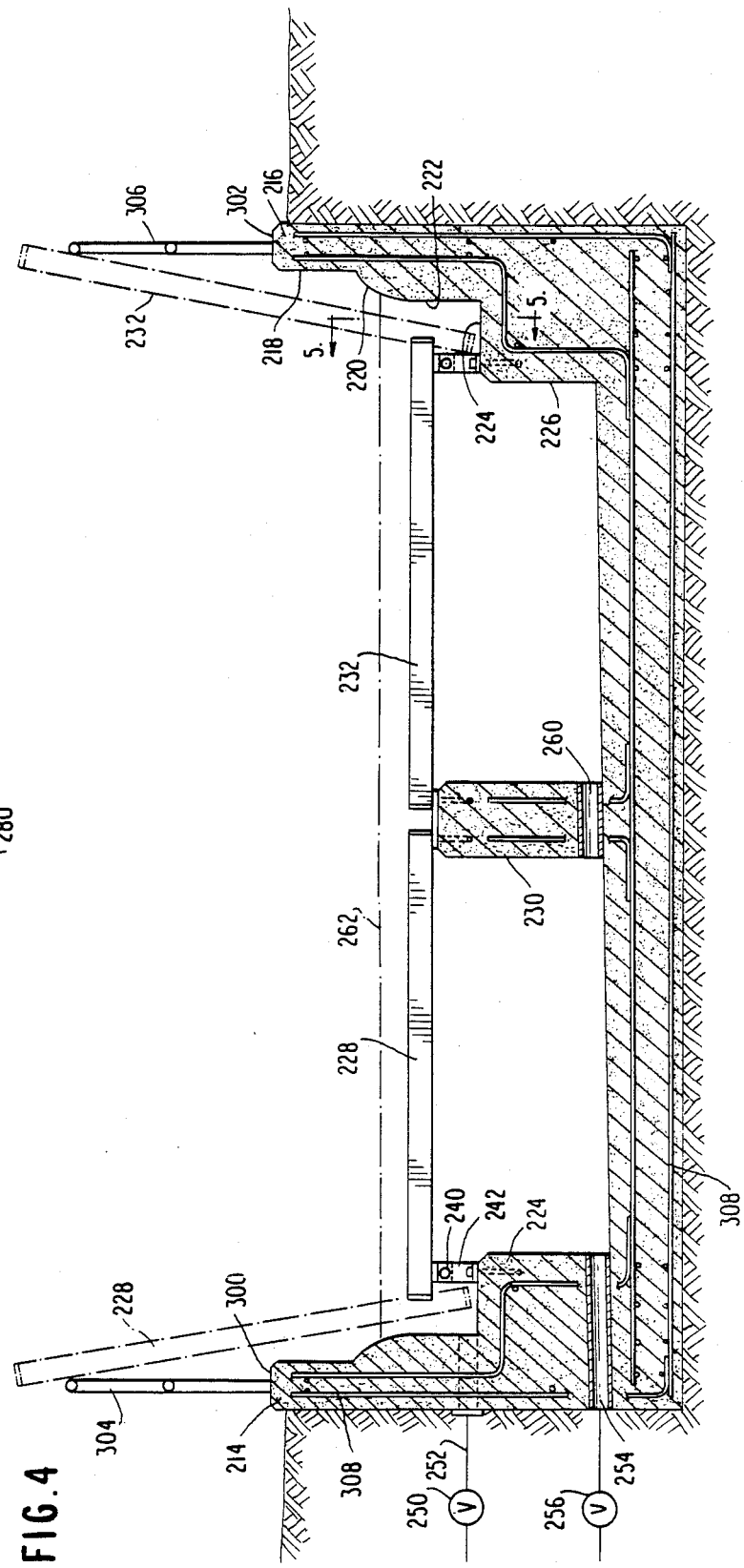

TRUCK TIRE WASHING APPARATUS

BACKGROUND OF THE INVENTION

1. Field of the Invention

This invention relates generally to the field of machines for washing vehicle tires mounted on wheels which, in turn, are mounted on axles of a vehicle and, more particularly, to an apparatus for washing mud and dirt from the tires of construction trucks as they are leaving a construction site and before entering upon the pavement of a road.

2. Description of the Prior Art

When a construction truck leaves a construction site, especially muddy sites, dirt and mud tend to adhere to the truck's tires, and to become embedded in the treads of the tires. When the truck then drives onto a paved road, there is left on the pavement a trail of mud and dirt. Many jurisdictions now require contractors to remove such mud and dirt from the pavement and also to comply with strict sediment control requirements, and subject contractors to penalties for not doing so, as debris on the pavement is environmentally inconsistent and presents to vehicular traffic. Some contractors attempt to solve the problem by manually sweeping the pavement to place it in its original condition.

Even though there are many known prior art devices for cleaning vehicles in general, and vehicle wheels and tires in particular, they are not particularly efficient in washing debris from the tires of a construction truck as it leaves a construction site and before it enters upon a paved road.

U.S. Pat. No. 1,467,994 discloses a drive-through in-ground washing bowl which has ribs on the submerged floor, itself, in order to help vibrate and remove mud from a vehicle's wheels. Pat. No. 620,321 shows a similar apparatus, but for use as a roller-coaster, and having undulations in the submerged part of a track.

In U.S. Pat. Nos. 3,179,117 and 3,903,559, the vehicle whose wheels are being cleaned is moved crosswise of a trailer bed on which a cleaning apparatus is mounted. In U.S. Pat. No. 3,903,559, the cleaning apparatus operates on an axle's worth of tires at a time, the apparatus rotates the truck's tires while the truck driver has the truck transmission in neutral, the device sprays water on the tires, and rollers driving the tires are raised after the truck has driven into position and, then, are lowered in order to permit the truck to be driven further forward.

The following U.S. patents are of further background interest, and several show the broad concept of an above-ground trough-type tire cleaning device in which a vehicle, while its tires are being cleaned, is supported on an elevated grid or the like located above the bottom of the trough: U.S. Pat. Nos. 118,085; 820,463; 1,338,714; 1,412,732; 1,484,071; 1,487,062; 1,479,841; 1,651,045; 1,694,197; 1,909,869; 2,716,767; 2,718,650; 2,797,006; 2,814,825; 2,981,266; 2,997,048; 3,058,133; 3,593,726; 3,681,805; 3,698,029 and 3,772,723.

SUMMARY OF THE INVENTION

The primary object of the invention is to provide improved apparatuses particularly adapted to washing the tires of construction trucks leaving a construction site and entering onto a paved road.

Another important object is to provide an improved in-ground tire washing device having removable grates which cause the tires to flex so that debris is removed therefrom.

Still another object is to provide such grates with serrated upper edges having projections which enter the treads of the truck tires for the purpose of removing embedded mud and dirt.

A further object of the invention is to provide an improved portable, trailer-mounted truck tire washing apparatus which can be moved from site to site for washing the tires of construction trucks.

Another object is to provide such a portable apparatus having roller assemblies for preventing sideway movement of the tires and for rotating the tires, respectively.

BRIEF DESCRIPTION OF THE DRAWING

FIG. 4 is a cross-sectional view taken along line 4—4 of FIG. 2;

FIG. 6 is a perspective view of an alternative grate usable as part of the invention;

DETAILED DESCRIPTION OF PREFERRED EMBODIMENTS

Figure 5:
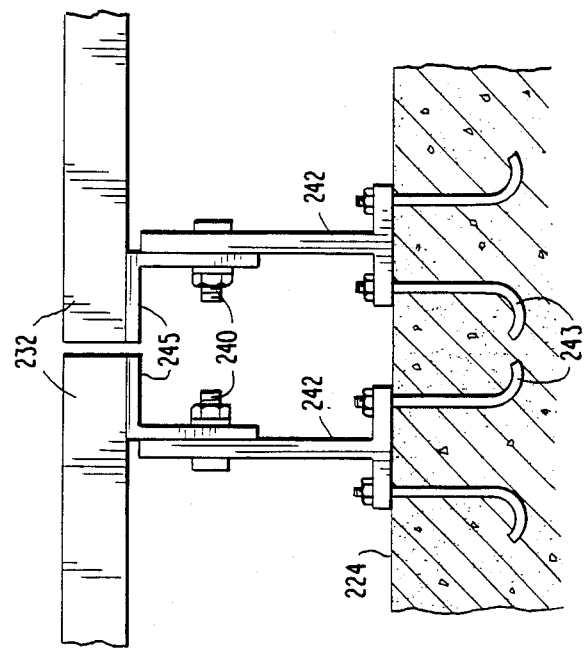
FIG. 5 is a cross-sectional view taken along line 5—5 of FIG. 4.
Figure 1:
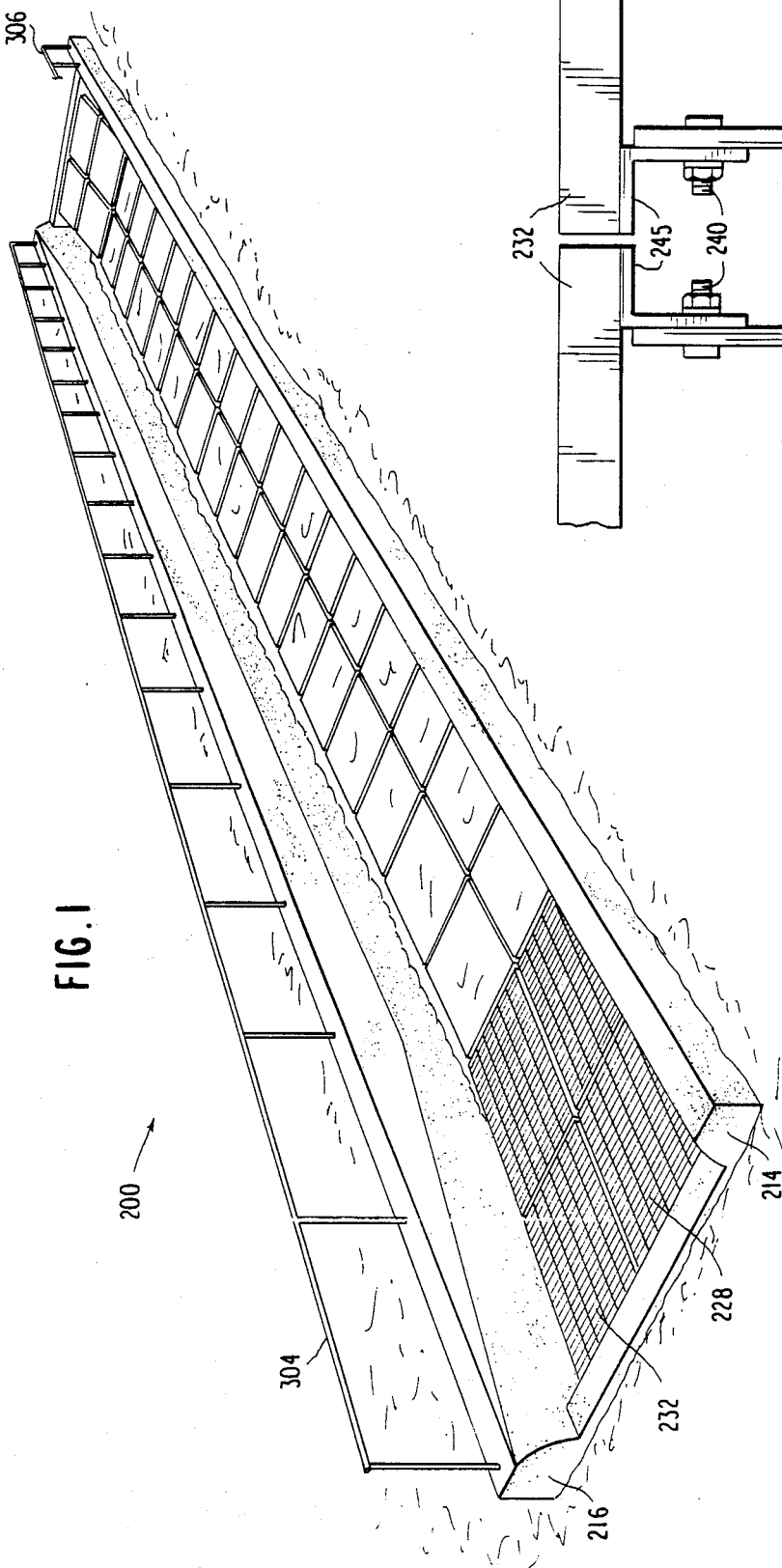
FIG. 1 is a perspective view of a first embodiment of the invention.
Figure 2:
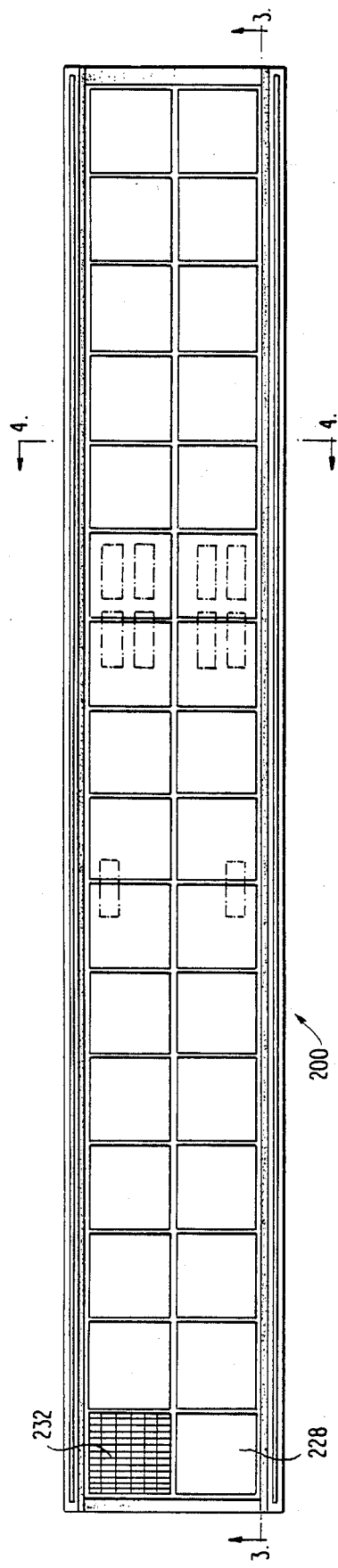
FIG. 2 is a plan view of the first embodiment.
Figure 3:
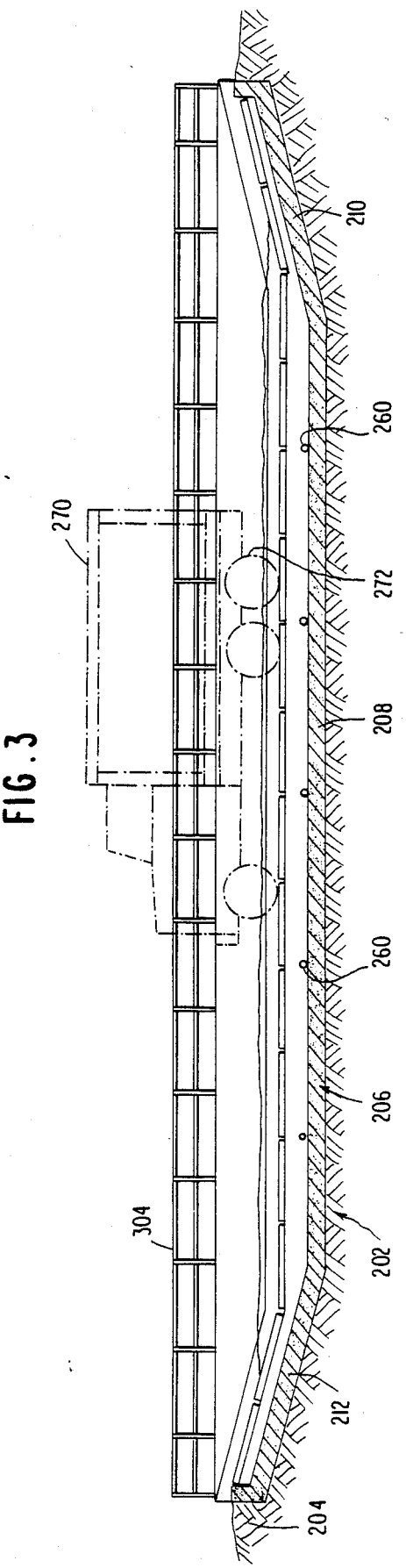
FIG. 3 is a cross-sectional view taken along line 3—3 of FIG. 2.

The apparatus illustrated in FIGS. 1-6 is the in-ground embodiment of the invention in the form of a tire washing apparatus which, by its design, maintains wash water turbidity while, at the same time, allowing construction truck tires to be cleansed by a natural water motion which is directed and controlled by both the shape of the sides the apparatus and also the steel grates on which the tires ride. This water motion also helps direct suspended sediment into the chambers formed under the steel grates. The special design of the apparatus not only provides the necessary cleansing motion of the water, but also helps control the tidal effect created by the passage of trucks through the apparatus which is generally designated by the reference numeral 200 in FIGS. 1, 2 and 3.

More specifically formed in a pit 202 in the ground 204 is a concrete trough 206 having a planar, slanted central portion 208, a downwardly inclined entrance portion 210 and an upwardly inclined exit portion 212. Trough 206 has specially designed sidewalls 214 and 216, each of which has formed on its inner surface a vertically straight upper portion 218, an inwardly directed convex portion 220 an intermediate straight portion 222, a horizontal portion 224 and a lower vertical portion 226. The convex portions tend to force sloshing water toward the center. A first longitudinally extending series of grates 228 are supported at their opposite transverse ends on horizontal wall portion 24 and a central, longitudinally extending concrete divider member 230 which tends to reduce sideways sloshing of the water. A second series of longitudinally extending grates 232 are also supported on the opposite horizontal portion 224 and on the central member 230. The grates 228 and 232 are pivotably connected by a pivot 240 mounted in a bracket 242 which is fixed by anchors 243 on the horizontal portion 224 of each of the sidewalls 214 and 216 of the trough. Each pivot pin also passes through a bracket 245 fixed to the underside of each grate. When it is necessary to remove accumulated sediment from the bottom of the trough, the grates 228 and 232 are pivoted upwardly and outwardly to the phantom line positions shown in FIG. 4.

The trough is filled from a water source (not shown) through a control valve 250 and an inlet line 252 which passes through the side wall 214. Sediment-carrying water is removed through a lower drain pipe 254 and another control valve 256 by gravity. For this purpose, and as viewed in FIG. 4, the top surface of the floor 206 slants slightly to the left towards drain pipe 254. In the bottom of the central dividing member 230 are through pipes 260 which permit water to flow from the chambers below the grates 232 to the drain pipe 254.

In operation, the trough is filled to the approximate water level 262 above the grates, which are formed of a steel mesh, and above the height of the tire annulus. When a truck 270 passes over the grates, the spaces in the mesh of the grates cause a slight vibration and a flexing of the truck's tires 272, thereby facilitating the removal of mud and dirt from the tires. The motion of the truck through the trough causes a tidal effect which aids in the washing action of the tires. The convex shape of the inner surface of the sidewalls reduces the transverse wave motion of the water.

Because the water level 262 is above the grates 228 and 232, the truck tires tend to be always moving through relatively clean water, as the sediment-containing water gravitates to the lower chambers and to the floor of the trough where it can be removed through the drain pipe 254.

FIG. 6 is a perspective view of another form of grate which performs even greater cleansing action of the tires. This grate 280 has transverse members 282 each of which has a tire-contacting upper surface 284 which is serrated, i.e., has upwardly directed projections 286 separated by recesses 288. These projections have a width dimension 290 which is designed to fit into the treads of typical truck tires and thereby force out mud which is embedded in the tire treads, as the truck passes over the series of transverse members 282. A typical width dimension 290 is $\frac{3}{8}''$ to $\frac{1}{2}''$. Since the serrations are tapered inwardly in the upward direction, and since the flexing of the tires tends to open the treads, this width dimension is not particularly critical so long as it is not wider than the width of treads encountered. The transverse spacing of the serrations is not critical so long as they are placed close enough together that at least one serration is likely to engage each tread of a truck tire.

The construction of the apparatus 200 is quite sturdy, since typical construction trucks may weigh 80,000 pounds or more.

Fixed to the upper edges 300 and 302 of the two sidewalls 214 and 216 are metal guard rails 304 and 306 against which the grates 228 and 232 rest in their cleaning position. Safety chains are fixed along the top rail for the purpose of restraining the grates during cleaning of the trough. The concrete is reinforced by suitable reinforcing rods 308.

Thus, this invention eliminates the need for sweeping pavements and also provides the normally required sedimentation control, while at the same time enhancing the tire washing action because the truck tires are riding on the grates in the relatively clean water above the grates. The sediment-carrying water falls by gravity to the grates and accumulates as sedimentation at the bottom the trough. As described above, the grates are periodically removed by pivoting them upwardly and outwardly so that accumulated sedimentation can be pumped or otherwise removed from the floor of the trough.

FIGS. 7-11 illustrate another embodiment of the invention.

Figure 7:
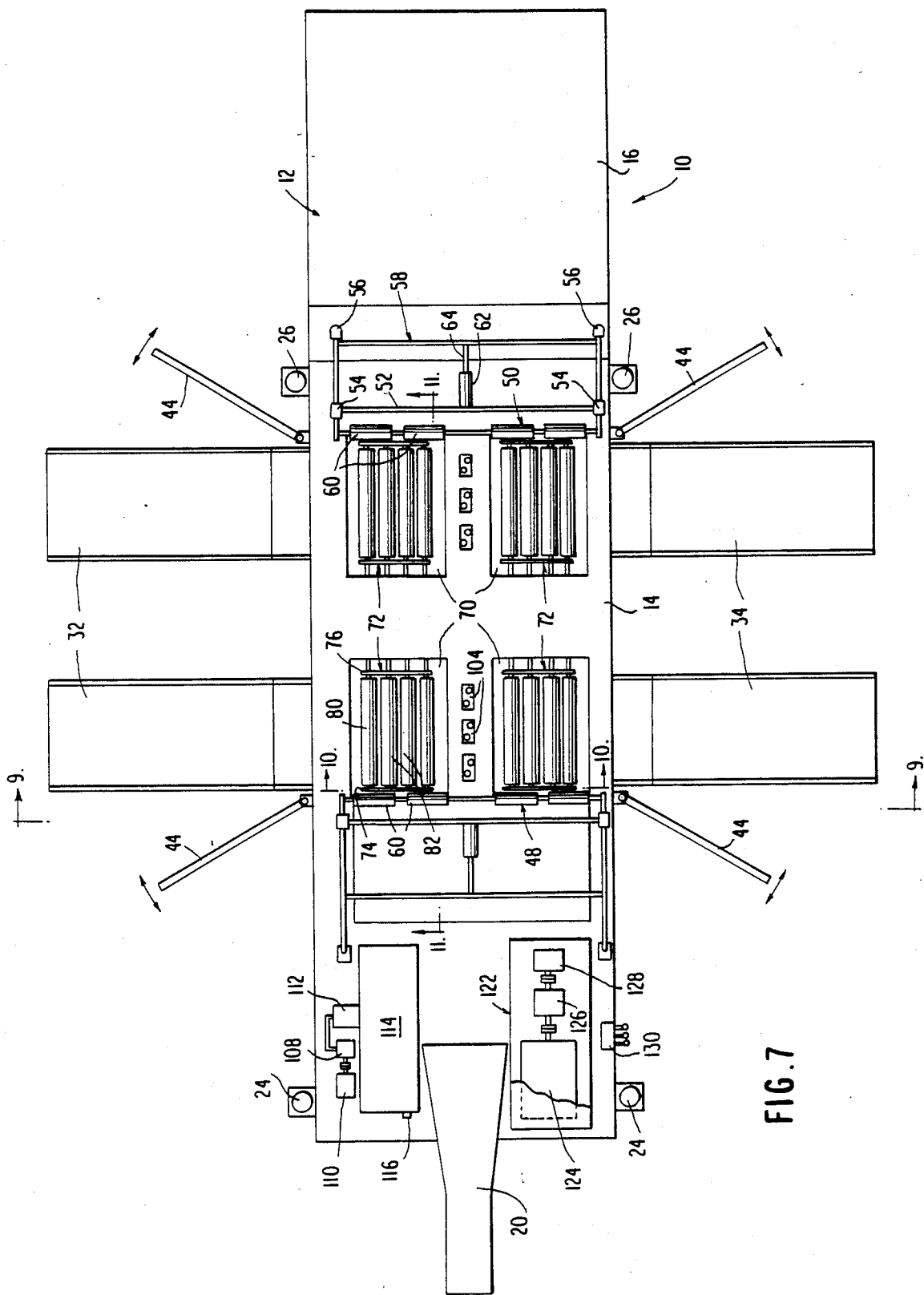
FIG. 7 is a top plan view of a second embodiment including a portable tire washing apparatus.
Figure 9:
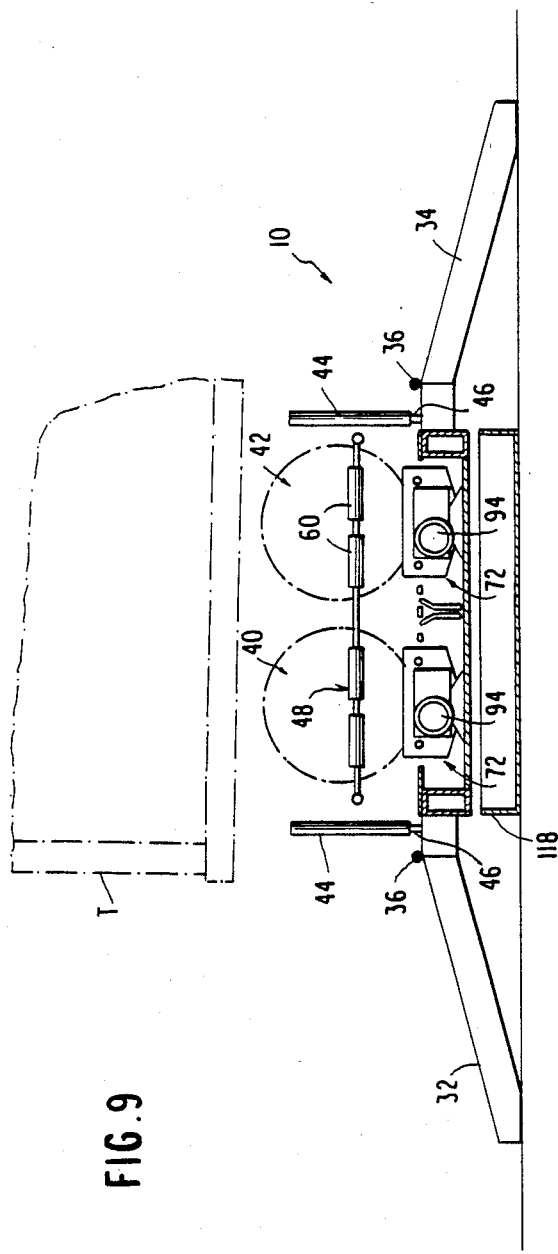
FIG. 9 is a transverse sectional view taken along line 9—9 of FIG. 7.
Figure 8:
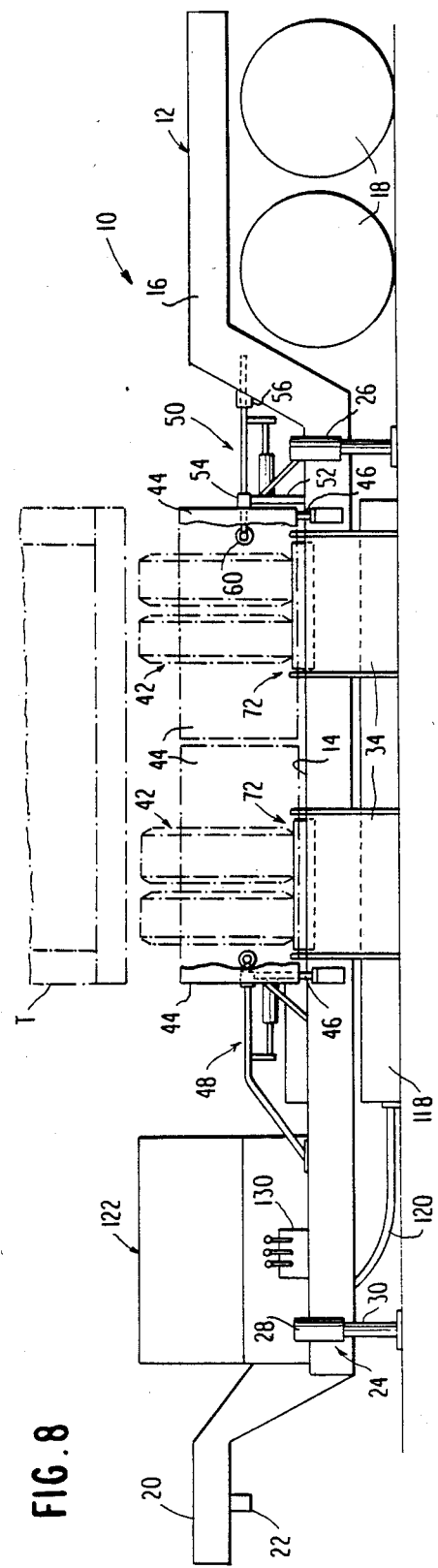
FIG. 8 is a side elevational view of the second embodiment.

The rotary truck tire washing apparatus generally designated at 10 in FIGS. 7-9 essentially comprises a conventional flat top trailer body 12 (known as a "lowboy" trailer) which has been modified to accommodate the components of the tire washing system.

As best shown in FIG. 8, the trailer 12 comprises a low profile flat bed 14 occupying most of the trailer's length. Bed 14 is connected at the rear of the trailer to an elevated section 16 supported by a pair of tires 18. At the opposite front end, there is a goose neck 20 comprising a fifth-wheel coupling schematically shown at 22.

Provided at 24 and 26 are hydraulically operated outriggers, each of which comprises an hydraulic cylinder 28 and a downwardly extendable piston rod 30 and which operates to stabilize the trailer assembly.

Another modification of the trailer body, includes a pair of access ramps 32 and a pair of exit ramps 34, as best shown in FIGS. 7, 8 and 9. As shown schematically at 36 in FIG. 8, ramps 32, 34 are preferably pivotably attached to the sides of the flat elongated bed 14.

Pivots 36 allow ramps 32, 34 to accommodate variations in the ground configuration. They also allow the ramps to be folded inwardly and upwardly when the trailer is moved from one construction site to another.

In FIG. 8 and FIG. 9 a truck body T is represented in phantom lines with its rear axles 40, 42 resting in the central portion of the bed 14. As clearly apparent in FIG. 8, the distances between the ramps of each pair of ramps 32, 34 are such as to accommodate the spacing between the pairs of wheels of the tires 40, 42.

A further modification of the trailer 12 consists of providing protection gates 44 as shown in FIGS. 7, 8 and 9. Pivotably mounted on respective vertical shafts 46, these gates can be manually positioned as shown in FIGS. 8 and 9, so that they isolate the area where the tire washing will take place.

To prevent sideway displacement of the truck body during the tire washing cycle to be described, centering roller assemblies 48, 50 are provided. Both assemblies 48, 50 are basically of the same design. Referring to assembly 50 in FIG. 8, for example, it comprises a supporting frame 52 secured to the top of trailer bed 14. Bearings 54, integral with supporting frame 52, and bearing 56, integral with trailer body 12, carry a centering roller frame 58 in such a fashion that rollers 60 can be displaced longitudinally (as seen in FIG. 8) to come very near the outer tires of each truck axle. Displacement of rollers 60 is controlled by means of an hydraulic cylinder 62 secured to fixed frame 52 and having a piston rod 64 connected to the slidable roller-carrying frame 58.

Disposed in alignment with ramps 32,34, are wells 70 (See FIG. 7) in the central bed portion 14. Each well 70 receives a truck wheel cradle assembly 72. In turn, each cradle assembly 72 is designed to accommodate a pair of left or right truck wheels, as best shown in FIG. 8.

Figure 10:
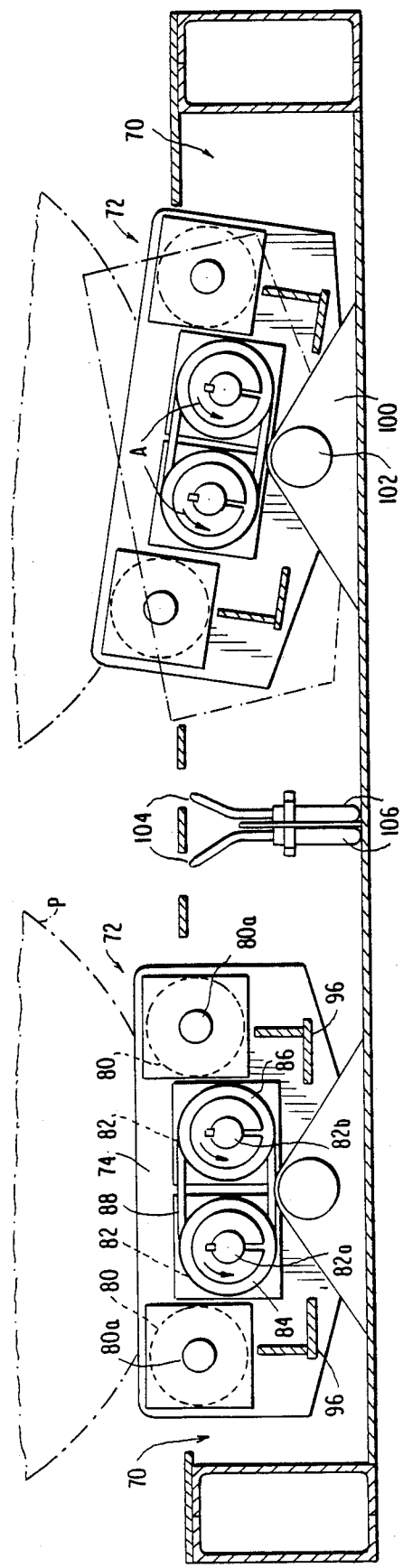
FIG. 10 is an enlarged sectional view taken along line 10—10 of FIG. 7 and showing an arrangement of supporting cradles for the truck axles.

Referring to FIG. 10, it can be seen that each cradle consists of a frame formed by side plates 74, 76 interconnected by welded members 78. Received within the space provided by side plates 74, 76 and members 78 are rollers 80 and 82 which are arranged to conform to the periphery P of the truck tires. As with the grates in the first embodiment, these rollers may have either a smooth surface or a serrated surface.

Figure 11:
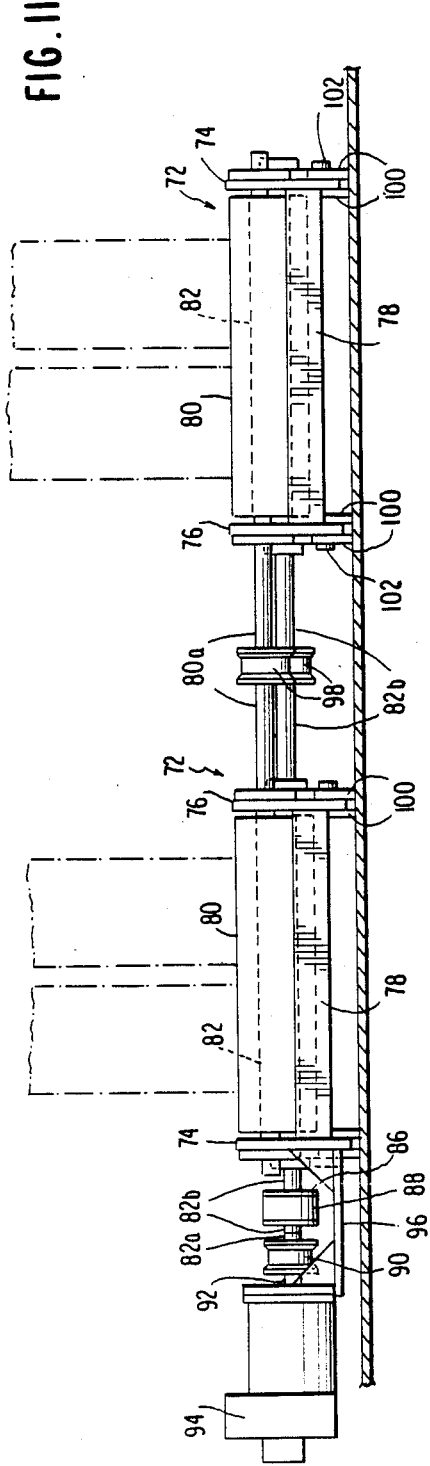
FIG. 11 is a fragmentary longitudinal section taken along line 11—11 of FIG. 7.

Free-wheeling rollers 80 are supported by shafts 80a which, in turn, are supported by side plates 74,76. Rollers 82 are supported by shafts 82a and 82b which, in turn, are supported by side plates 74, 76. The shafts 82, 82b are driven, as will be described hereafter, and are interconnected by means of sprockets 84, 86 and a timing belt 88. As seen in FIG. 11, the end of shaft 82a is connected by means of coupling 90 to the output shaft 92 of a hydraulic motor 94. Also shown in FIG. 11 is the hydraulic motor-mounting plate 96 welded to side plate 74. In addition, and as also shown in FIG. 11, all the shafts 80a, 82a, 82b of one cradle 72 are connected by means of couplings 98 to the shafts of the longitudinally adjacent cradle 72. Thus, when motor 94 is energized to drive shafts 82a, 82b, all four rollers 82 of the two cradles corresponding to one truck axle are rotated in the direction of arrows "A".

Further shown on the right side of FIG. 10 is the manner in which the cradles 72 are mounted onto the trailer bed. Pairs of brackets 100 welded to the trailer floor are disposed on either side of the side plates 74, 76 (FIG. 11). Pins 102 allow rocking displacement of cradles 72 in order to facilitate either the access or the exit of the truck tires, and to accommodate possible slight variations of the distance between truck axles.

Shown in detail in FIG. 10 (and schematically in FIG. 7) is the location of jets 104 for directing pressurized water onto the truck tires. Jets 104 are connected by means of high pressure hoses 106 to a pump 108 driven by motor 110. Pump 108 is connected to water tank 114 by way of a filter 112. Make-up water can be supplied by means of coupling 116 to water tank 114. As seen in FIG. 8, a water reclamation pan 118 is disposed underneath the trailer bed 14 and is connected by means of hose 120 to the source of pressurized water.

As schematically shown in FIGS. 7 and 8, a power source 122, formed by a diesel engine 124 and hydraulic pumps 126, 128, supplies hydraulic power to the different motors and cylinders of the system through a control panel 130.

In operation, truck T is driven to the position shown in FIG. 9 while motors 94 are deenergized; the protection gates are swung into the position shown in FIGS. 8 and 9; the truck drive is placed in "neutral"; and motors 94 energized while water jets 104 are supplied with pressured water. At the end of the washing cycle, motors 94 are deenergized (prevented from rotating), thereby allowing Truck T to be driven down ramps 34.

What is claimed is:

1. An in-ground truck tire washing apparatus comprising;
    an elongated concrete trough disposed in a ground pit having a configuration substantially the same as that of said trough;
    said trough having transversely spaced concrete sidewalls each having a convex portion directed to the center of the trough;
    a central member extending longitudinally of the trough;
    a first plurality of open-mesh grates supported on one sidewall and the central member;
    a second plurality of open-mesh grates supported on the other sidewall and said central member;
    a downwardly inclined truck entrance ramp covered by said grates;
    an upwardly inclined truck exit ramp covered by said grates; and
    means for filling said trough with a tire-cleaning fluid to a level above upper surfaces of said first and second grates positioned over a horizontal portion of the bottom of said trough so that a truck moved over said grates will have its tires at least partially submerged in the tire-cleaning fluid to thereby clean the tires by a combined action of the fluid and the grates.

2. An apparatus as defined in claim 1, further comprising a drain pipe disposed on the bottom of said trough and exiting through said one sidewall; and
    a plurality of transverse through-pipes extending transversely through said central member; the bottom of said trough being downwardly inclined towards said one sidewall.

3. An apparatus as defined in claim 2, wherein upper edges of said grates are smooth.

4. An apparatus as defined in claim 2, wherein upper edges of said grates are serrated and have transversely spaced, upwardly tapered projections designed to fit into treads of tires to dislodge debris therefrom.

5. An apparatus as defined in claims 3 or 4, further comprising means for pivotably mounting said grates on the respective sidewalls so that said grates can be swung upwardly and outwardly to permit removal of accumulated sediment from the bottom of the trough.

6. An apparatus as defined in claim 5, further comprising: guard rails mounted on top of said sidewalls: and restraining means, spaced along said rails, for restraining said grates in their upward position.

* * * * *